(12) United States Patent
Budica (10) Patent No.: US 11,005,359 B2
(45) Date of Patent: May 11, 2021

(54) ELECTRIC POWER CONVERTER WITH SNUBBER CIRCUIT

(71) Applicant: DET International Holding Limited, George Town (KY)

(72) Inventor: Lucian Budica, Bukarest (RO)

(73) Assignee: DET International Holding Limited, George Town (KY)

( * ) Notice: Subject to any disclaimer, the term of this patent is extended or adjusted under 35 U.S.C. 154(b) by 338 days.

(21) Appl. No.: 15/847,365

(22) Filed: Dec. 19, 2017

(65) Prior Publication Data

US 2018/0183323 A1   Jun. 28, 2018

(30) Foreign Application Priority Data

Dec. 23, 2016 (EP) ..................... 16464013

(51) Int. Cl.
  *H02M 1/34* (2007.01)
  *H02M 3/155* (2006.01)
  (Continued)

(52) U.S. Cl.
  CPC ............. *H02M 1/34* (2013.01); *H02M 3/155* (2013.01); *B60K 6/22* (2013.01); *B60L 50/52* (2019.02);
  (Continued)

(58) Field of Classification Search
  CPC ....... B60K 6/22; B60L 2210/12; B60L 50/52; B60L 53/10; B60L 53/30; B60L 53/57; B60L 53/60; B60L 53/62; B60L 53/66; B60L 53/67; B60L 53/68; B60Y 2200/91; B60Y 2200/92; B60Y 2400/61; H02J 7/0027; H02M 1/34; H02M 2001/348; H02M 3/155; H02M 3/158; Y02T 10/7005; Y02T 10/7088; Y02T 90/125;
  (Continued)

(56) References Cited

U.S. PATENT DOCUMENTS

| | | | | |
|---|---|---|---|---|
| 5,077,651 A | * | 12/1991 | Kobayashi | H02M 1/34 363/56.05 |
| 5,841,268 A | * | 11/1998 | Mednik | H02M 1/34 323/222 |

(Continued)

FOREIGN PATENT DOCUMENTS

| | | |
|---|---|---|
| DE | 32 41 086 A1 | 5/1984 |
| EP | 0419230 A2 | 3/1991 |

(Continued)

OTHER PUBLICATIONS

European Search Report for EP application No. 16464013.8, Issued by the European Patent Office, dated Jun. 14, 2017.
(Continued)

*Primary Examiner* — Jared Fureman
*Assistant Examiner* — Nicolas Bellido
(74) *Attorney, Agent, or Firm* — Vector IP Law Group LLC; Robert S. Babayi (57) ABSTRACT

An electric power converter has a first converter terminal, a second converter terminal, a converter switch and a snubber circuit. The snubber circuit comprises a snubber switch and a passive network connected to the snubber switch. The snubber circuit is connected to the converter switch, the first converter terminal and the second converter terminal.

19 Claims, 5 Drawing Sheets

(51) Int. Cl.
*B60K 6/22* (2007.10)
*H02M 3/158* (2006.01)
*B60L 50/52* (2019.01)

(52) U.S. Cl.
CPC ....... *B60L 2210/12* (2013.01); *B60Y 2200/91* (2013.01); *B60Y 2200/92* (2013.01); *B60Y 2400/61* (2013.01); *H02M 3/158* (2013.01); *H02M 2001/348* (2013.01); *Y10S 903/904* (2013.01)

(58) Field of Classification Search
CPC ..... Y02T 90/128; Y02T 90/14; Y02T 90/163; Y10S 903/904
See application file for complete search history.

(56) References Cited

U.S. PATENT DOCUMENTS

| | | | | |
|---|---|---|---|---|
| 5,847,941 | A * | 12/1998 | Taguchi | H02M 1/34 363/21.03 |
| 6,046,920 | A * | 4/2000 | Cazabat | H02M 7/519 363/136 |
| 6,452,815 | B1 * | 9/2002 | Zhu | H02M 1/34 363/17 |
| 7,408,793 | B2 * | 8/2008 | Jitaru | H02M 1/34 363/52 |
| 8,138,720 | B2 * | 3/2012 | Snyder | B60K 6/448 320/127 |
| 8,964,414 | B2 * | 2/2015 | Kojima | H02M 3/33576 363/17 |
| 2011/0090716 | A1 * | 4/2011 | Asuke | H02M 1/34 363/21.01 |
| 2011/0273159 | A1 * | 11/2011 | Tabata | H02M 7/538 323/311 |
| 2012/0049834 | A1 * | 3/2012 | Pommerenke | H02M 1/34 323/311 |
| 2012/0275203 | A1 * | 11/2012 | Shimada et al. | H02M 1/4225 363/84 |
| 2014/0167720 | A1 | 6/2014 | Chiang | |
| 2014/0192573 | A1 * | 7/2014 | Tabata | H02M 7/538 363/56.12 |

FOREIGN PATENT DOCUMENTS

| | | | |
|---|---|---|---|
| EP | 2309631 | A1 | 4/2011 |
| JP | H09149640 | A | 6/1997 |
| JP | 2000333439 | A | 11/2000 |
| JP | 2001054279 | A * | 2/2001 |
| JP | 2011239527 | A | 11/2011 |
| JP | 2014036552 | A * | 2/2014 |

OTHER PUBLICATIONS

Hong Mao et al: "An active-clamp snubber for isolated half-bridge DC-DC converters", IECON 2003, IEEE, vol. 1, Nov. 2, 2003, pp. 42-48, XP010692762.
Shigemoto H et al, "Zero-Voltage-Switching Boost Converter for On-Board EV Charger", 3th European Conference on Power Electronics and Applications. Lausanne, CH, Sep. 7-9, 1999; [EPE . European Conference on Power Electronics and Applications], EPE ASSOCIATION, Brussels, BE, vol. Conf. 8, Sep. 7, 1999 (Sep. 7, 1999), pp. 1-10, XP000890336.
European Search Report dated Dec. 7, 2020, 5 pages.
Chinese Office Action dated Sep. 27, 2020, 14 pages.

* cited by examiner

ELECTRIC POWER CONVERTER WITH SNUBBER CIRCUIT

FIELD OF THE INVENTION

The invention relates to an electric power converter having a first converter terminal, a second converter terminal, a converter switch and a snubber circuit comprising a snubber switch and a passive network connected to the snubber switch.

BACKGROUND ART

Electric power converters with inductive loads or components frequently comprise snubber circuits. The sudden interruption of current flow leads to a sharp rise in voltage across the switch or switches of the converter. If the surge voltage generated across the switch is beyond the specification of the switch, the switch might be destroyed. Additionally, this transient can be a source of electromagnetic interference (EMI) in other circuits. The snubber provides a short-term alternative current path around the switch so that the inductive component may be discharged in a more controlled way. Inductive components are often unintentional and/or unavoidable (parasitic inductance) caused by wiring loops in the physical implementation of a converter.

Snubbers are commonly connected in parallel with the switch of the converter. Snubbers usually comprise a resistor and a capacitor connected in series. However, they might comprise further elements and might, depending on the specific converter and requirements, be connected to different locations of the converter:

US 2012/0049834 (Pommerenke et al.) discloses a synchronous buck converter using two MOSFETs as switches. A snubber circuit comprising a small inductor and a small resistor is placed in series with either one of the two MOSFETs and at either terminal of the respective MOSFET. The snubber circuit reduces essentially the voltage ringing between ground and the node connecting the two MOSFRETs.

EP 2 309 631 (Asuke et al.) discloses a multiphase, transformer-linked, boost converter using IGBTs and diodes as switches. A snubber circuit comprises a resistor and a capacitor connected in series as well as a snubber diode with the anode thereof connected to the node connecting the resistor and the capacitor. The series connection of the resistor with the capacitor of the snubber circuit is connected in parallel with the output of the converter. The cathode of the snubber diode is connected to the node connecting the two primary windings of the transformer. The snubber circuit suppresses recovery losses of the diodes as well as switching losses in the IGBTs during their turn-on. Further, the snubber circuit reduces surge voltage and noise generation across the IGBTs and, therefore, prevents them from being broken. In addition, as the snubber capacitor is clamped to the output voltage of the converter, no discharge of the snubber capacitor is performed and no power loss will occur. Moreover, as there is no time needed for charge or discharge of the capacitor of the snubber circuit, high frequency operation is possible.

US 2014/0167720 (Chiang) discloses an energy efficient buck converter using two MOSFETs as switches. At high power states of the buck converter, i.e. at high output voltage and high switching frequency, a snubber circuit is connected to the node between the two MOSFETs and to ground via a further switch. At low power states of the buck converter, the snubber circuit is disconnected from the buck converter to improve the efficiency of the buck converter. The snubber circuit comprises a resistor and a capacitor connected in series.

A first disadvantage of the prior art is that the reduction of surge voltages and voltage ringing across the converter switch or across the converter switches can be insufficient and even a reduced surge voltage can lead to an overvoltage across the converter switch and the failure thereof, if the power converter comprises (parasitic) inductances other than those considered in the examples shown above. A further disadvantage is that capacitive components frequently connected in parallel to the converter switches might be overheated and, as a consequence thereof, might also fail. An additional disadvantage is that active semiconductor switches in a snubber circuit, such as transistors, require considerable and fast control circuitry which makes such snubber circuits rather expensive.

SUMMARY OF THE INVENTION

It is the object of the invention to overcome or reduce at least one disadvantage of the prior art. In particular, an object of the invention is to provide an electric power converter with significantly reduced surge voltages across a converter switch of the electric power converter. Further, it is an object of the invention to provide a method for reducing the surge voltages across the converter switch of an electric power converter.

The solution of the invention is specified by the features of independent claims 1 and 15. The invention concerns an electric power converter that has a first converter terminal, a second converter terminal, a converter switch and a snubber circuit. The snubber circuit comprises a snubber switch and a passive network connected to the snubber switch. According to the invention, the snubber circuit is connected to the converter switch, the first converter terminal and the second converter terminal.

An advantage of the electric power converter according to the invention is that for different layout designs of the converter the surge voltage and voltage ringing across the converter switch can be reduced significantly. Especially, increased distances between the first converter terminal and the converter switch and/or increased distances between the second converter terminal and the converter switch, both increasing the parasitic inductance, can be compensated for with the snubber circuit. Consequently, the blocking voltage requirement of the converter switch can be reduced which in turn allows to employ a more cost effective converter switch. In addition, a converter switch with a lower blocking voltage requirement has lower conducting losses. Therefore, the efficiency of the electric power converter can be increased. Also, one or more filter capacitors which may be connected between the first and second converter terminal are exposed to reduced surge and ringing voltages. As a result, their losses during operation are reduced. This leads to lower temperatures of the filter capacitors during operation. Alternatively, filter capacitors with reduced voltage and/or current requirements can be used.

An electric power converter is a device capable of converting electric energy from one form to another by using electronic switches. An electric power converter may convert electric energy from AC to DC or vice versa, or changing frequency (AC to AC), or voltage (DC to DC) or combinations thereof.

Converter terminals are terminals of an electric power converter for connecting the electric power converter with a supply of electric energy. Depending on the type of power converter, there can be two or more converter terminals serving as supply terminals and/or two or more converter terminals serving as load terminals. Usually, the supply terminals are also referred to as input terminals and the load terminals are also referred to as output terminals. The designations input/supply-terminals and output/load-terminals depend on the flow of energy through the electric power converter. As electric power converters may include bidirectional electric power converters, the flow of energy through the electric power converter depends on the mode of operation of the electric power converter. Hence, if the mode of operation changes, i.e. the flow of energy through the electric power converter changes, the input/supply-terminals might become output/load-terminals, and vice versa. The converter terminals of an electric power converter are isolated from each other and are not intended to be connected to each other during operation. In particular, the first converter terminal can be different from the second converter terminal. However, electric power converters without galvanic isolation between the input terminals and the output terminals may have a connection of one input terminal with one output terminal, which may be for example the negative supply and the negative load terminal, often referred to as ground. A first converter terminal and a second converter terminal can form input terminals or output terminals, depending on the mode of operation of the electric power converter. However, the first converter terminal shall be devoid of forming an input terminal while the second converter terminal forms an output terminal, or vice versa.

A converter switch shall be a switch located in the path of the main flow of energy through the converter. When switched on, the converter switch conducts essentially the main current of the converter, or a fraction thereof, if converter switches are arranged in parallel. When switched off, the converter switch is exposed essentially to the main voltage of the converter, or a fraction thereof, if converter switches are arranged in series. The main voltage can be the voltage between the first converter terminal and the second converter terminal. The converter switch can be connected either to the first converter terminal or the second converter terminal.

A snubber circuit shall be suitable for reducing both a surge voltage and a voltage ringing across a converter switch. Such snubber circuits may be exposed to significant voltages, currents and/or electric power. Significant voltages, currents and/or electric power can be much larger than voltages, currents and/or electric powers used in data processing, signal processing and/or communications.

A passive network shall be understood as a network comprising passive components only. Such passive components can include but are not limited to resistors, capacitors and inductors.

A connection which connects components of the electric power converter shall be understood primarily as an electrical connection. If two components are connected, they are in an electrically conducting way connected. Such connections can include but are not limited to conductive wires, conductive tracks or pads on a printed circuit board, conductive bars for high currents, soldered joints and conductive fasteners as for example clips or clamps. In addition, some electrically conductive connections may provide a mechanical support, for example printed circuit boards, conductive bars, and some fasteners.

The passive network can be devoid of a direct connection with the converter switch. A direct connection with the converter switch shall be understood as a connection which is located physically nearby the converter switch and devoid of long wiring. A direct connection with the converter switch shall not be understood as a connection, for example, of the passive network with a first converter terminal, which is further connected with the converter switch. A direct connection shall have a minimum parasitic inductance.

In a preferred embodiment, the electric power converter is a DC-DC converter.

When used in a vehicle, as for example an electric vehicle or a hybrid vehicle, the electric power converter is with advantage a DC-DC converter.

As an alternative to the DC to DC converter, the electric power converter can be any AC to AC converter, any AC to DC converter or any DC to AC converter to meet the needs of any specific application. For example, railways comprising locomotives, coaches, trains and or trams are confronted with a plurality of different voltage systems. One skilled in the art may easily adapt the input and/or the output of the power converter to the needs of a specific application by for example providing conversion means to convert a given AC input to a DC input or to provide conversion means to convert a DC output of the power converter to an AC output as required in a specific application.

In another preferred embodiment, the electric power converter is a buck converter. The buck converter is used with advantage when converting electric power having a first voltage into electric power having a second voltage, with the first voltage being larger than the second voltage.

As an alternative to the buck converter, the electric power converter can be a boost converter or a buck-boost converter if a specific application requires such a converter.

In a further preferred embodiment, the electric power converter is a multi-stage buck converter. Especially when arranged as an interleaved multi-stage buck converter, the electromagnetic interference can be reduced. Further, several smaller converter switches can be employed instead of one single large converter switch. This can create advantages with respect to the efficiency of the converter when operated under partial load. In addition, a failure of one of the several smaller converter switches may not cause a complete failure of the electric power converter, thereby providing a certain redundancy and increasing the reliability of the electric power converter.

As an alternative to the multi-stage buck converter, the electric power converter can be a single-stage buck converter. However, the multi-stage buck converter provides several advantages as mentioned above.

A DC-DC converter shall be understood as an electric power converter which converts a first electric power having a first non-alternating voltage and a first non-alternating current into a second electric power having a second non-alternating voltage and a second non-alternating current. The first non-alternating voltage can be different from the second non-alternating voltage and the first non-alternating current can be different from the second non-alternating current. In practice, the first electric power, i.e. the input power, will be slightly larger than the second electric power, i.e. the output power, as the efficiency of the electric power converter is less than 100%.

A buck converter, also known as a step-down converter, is a DC-DC converter having a first non-alternating voltage larger than a second non-alternating voltage.

A multi-stage converter is an electric power converter with multiple power stages. Such power stages can be connected in parallel and/or in series.

A multi-stage buck converter can be a buck converter with a plurality of buck converters which are, for example, connected in parallel, i.e. the respective input terminals of the plurality of buck converters are connected to each other, and the respective output terminals of the plurality of buck converters are connected to each other.

A DC-DC converter according to the invention can, for example, be operated with a non-alternating input voltage in a range from 20V to 100V, in particular from 30V to 80 V, and specifically from 40V to 60V. The DC-DC converter can be operated with an input current of up to 200 A. The DC-DC converter can be operated with a non-alternating output voltage within a range from 10V to 20V, in particular from 11.7V to 16V. The DC-DC converter can be capable of providing an output power of up to 3 kW.

In a further embodiment, the first converter terminal is a positive input voltage terminal and the second converter terminal is a negative input voltage terminal or ground terminal.

This embodiment has the advantage that surge voltages and voltage ringing caused by a parasitic inductance between the converter switch and either the positive input voltage terminal of a DC-DC converter or the negative input voltage terminal of a DC-DC converter can be suppressed effectively.

However, the input terminals can also be swapped, i.e. the first converter terminal being the negative input terminal and the second converter terminal being the positive input terminal.

During operation of the electric power converter, a positive input terminal of an electric power converter, especially of a DC-DC converter, is connected to a positive pole of a supply voltage. A negative input terminal of an electric power converter, especially of a DC-DC converter, is connected to a negative pole of a supply voltage during operation of the converter. The negative terminal is often also referred to as a ground terminal.

In a further embodiment, the converter switch is connected to the first converter terminal.

This embodiment has the advantage that surge voltages and voltage ringing caused by a parasitic inductance between the first converter terminal and the converter switch, for example caused by a current measurement device, can be suppressed effectively.

The converter switch can be connected to the first converter terminal directly or indirectly. Here, a direct connection means a connection without any other component in between. An indirect connection of the converter switch with the first converter terminal can be, for example, a connection of the converter switch to a current measurement device, which is then connected to the first converter terminal. The output of a current measurement device can be used by a controller of the electric power converter, for example to control a current of the electric power converter, or for over-current protection.

Unless otherwise specified, the term connected is to be understood as directly or indirectly connected throughout the whole specification.

The connection of the converter switch with the first converter terminal can comprise a predetermined physical length and, consequently, a parasitic inductance.

A current measurement device can be, for example, a current transformer. A current transformer can have a leakage inductance, i.e. a parasitic inductance.

In an embodiment, the converter switch is a semiconductor switch.

Semiconductor switches can by switched on and off at high frequencies. The higher the switching frequency, the smaller can be the inductor of a power converter. The smaller the converter's inductor, the lighter, smaller and more cost-effective is the entire electric power converter.

As an alternative to the semiconductor switch, the converter switch can be any electromagnetic switch such as a relay, or it can be any vacuum or electron tube. However, these switches have a shorter life time than semiconductor switches or are less performant, respectively.

In a preferred embodiment, the converter switch is a transistor. A broad variety of transistors is commercially available. An appropriate transistor can be determined depending on the application without difficulty.

As an alternative to the transistor, the semiconductor switch can be a thyristor or a gate turn off thyristor (GTO). These switches provide advantages when used in electric power converters with a power rating larger than 100 KW or several 100 KW. At lower power rating, and especially at frequencies higher than essentially 1 KHz, transistors have advantages.

In an even more preferred embodiment, the converter switch is a field effect transistor. Field effect transistor have comparably small switching losses, hence they are especially suitable for higher switching frequencies.

As an alternative to the field effect transistor, the transistor can be a bipolar transistor or an insulated gate bipolar transistor (IGBT). While their conducting losses might be smaller than those of field effect transistors, the switching losses of bipolar transistors or gate insulated bipolar transistors are higher than those of field effect transistors.

The switching frequency of the converter switch of the electric power converter according to the invention can be in a range from 10 kHz to 10 MHz, in particular from 100 kHz to 1 MHz and more specifically from 150 kHz to 300 kHz.

The inductor of the electric power converter can have an inductance in the range from 50 nH to 50 µH, in particular from 200 nH to 10 µH and specifically from 1 µH to 2 µH.

A switch is a device that enables or disables the flow of an electric current between its terminals, or diverts it from one path to another path, when it is turned on or off, respectively. A semiconductor switch can display a range of useful properties such as passing current more easily in one direction than the other, as for example a diode, and showing variable resistance. A transistor is a semiconductor switch used, for example, to switch electric power. A transistor has at least three terminals, two of them connected to the path of electric power, and one terminal connected to a controller to control the switching. A field effect transistor (FET), sometimes called a unipolar transistor, uses either electrons (in n-channel FET) or holes (in p-channel FET) for conduction. The four terminals of the FET are named source, gate, drain, and body (substrate). On most FETs, the body is connected to the source inside the package. Especially metal-oxide-semiconductor FETs (MOSFET) are widely used.

In a further embodiment, the snubber switch is a semiconductor switch. The advantages and alternatives of semiconductor switches have been mentioned already in the context of the converter switch.

In a preferred embodiment, the snubber switch is a diode.

The advantage of diodes is that they do not require any control by a controller and that they are available for different power ratings, i.e. maximum blocking voltages and maximum currents as well as different reverse current properties.

As an alternative to the diode, the semiconductor switch can be a transistor. However, although possibly having less conducting losses and therefore contributing to a better efficiency of the electric power converter, the transistor requires an additional control and therefore would make the electric power converter more complicated.

In a preferred embodiment, the diode is connected with an anode thereof to the converter switch. The diode effectively can clamp the voltage across the converter switch when, for example, being connected to the converter switch and to a capacitor.

In a further embodiment, the passive network comprises a first capacitor, a second capacitor and a node connecting the first capacitor, the second capacitor and the snubber switch.

Experiments have shown that best suppression of surge voltage and voltage ringing were achieved with the passive network according to this embodiment. Further, the passive network of this embodiment causes minimal power losses, which increases the efficiency of the electric power converter. Also, energy from the surge voltage and/or voltage ringing across the converter switch can be recovered and transferred back to the input terminals of the electric power converter. This further increases the efficiency of the electric power converter according to the invention.

The first capacitor and the second capacitor can have a capacitance in a range from 1 nF to 10 μF, in particular from 10 nF to 1 μF, and specifically from 100 nF to 500 nF. The first capacitor and the second capacitor can have the same capacitance.

In a preferred embodiment, the first capacitor is connected to the first converter terminal and the second capacitor is connected to the second converter terminal.

Having such advantageous connections, the first capacitor and the second capacitor do not have to be completely charged and/or discharged, respectively, during a switching cycle of the converter switch. With respect to fast voltage changes, both capacitors are only exposed to the surge voltage and voltage ringing across the converter switch but not to the regular voltage changes across the converter switch from essentially zero Volt when turned on to essentially supply voltage when turned off. Regular voltage change shall be understood as a voltage change inherent to the working principle of the electric power converter, in contrast to the surge voltage and voltage ringing caused by parasitic effects and suppressible through a snubber circuit according to the invention. The regular voltage change across the converter switch is not suppressible by the snubber circuit.

Further, the snubber activation voltage is automatically adjusted with the supply voltage, i.e. input voltage of the electric power converter. When exposed to voltages below the activation voltage, the snubber circuit is inactive. The snubber circuit automatically adapts to different supply voltage levels of the electric power converter, i.e. to different input voltages across the first converter terminal and the second converter terminal.

In a further embodiment, the passive network further comprises a resistor connected in parallel with the first capacitor.

Compared to a snubber circuit without such a resistor, the resistor improves the suppression of the voltage ringing across the converter switch and provides damping of voltage oscillations across the converter switch.

The resistor can have a resistance in a range from 10 mΩ to 10Ω, in particular from 100 mΩ to 1Ω and specifically from 300 mΩ to 700 mΩ.

In a further embodiment, the snubber circuit is arranged such that a connection of the snubber circuit to the first converter terminal possesses a larger inductance than a connection of the snubber circuit to the second converter terminal and/or a connection of the snubber circuit to the converter switch.

The closer the snubber circuit is placed to the converter switch and ground, i.e. the smaller any inductance, in particular any parasitic inductance of the connection of the snubber circuit with the converter switch and of the snubber circuit with ground is, the better is the suppression of surge voltages and voltage ringing across the converter switch. "Placed close to" shall mean "placed in short distance to", i.e. at low parasitic inductance.

With advantage, the snubber circuit is placed close to such a location in the electric power converter where the highest surge voltage and/or voltage ringing would be detected if the snubber circuit was absent.

The snubber circuit can also be arranged more distant from the converter switch than described above. Due to the higher parasitic inductances caused thereby, the suppression of the surge voltage will be less effective.

In another preferred embodiment, the snubber switch and the second capacitor are located in minimum distance to the converter switch and a further switch of the electric power converter and/or the second converter terminal.

With advantage, the second converter terminal is formed by a ground plane, in particular by a ground plane of a printed circuit board, to ensure short distances to the elements of the snubber circuit, in particular to the second capacitor.

In a further embodiment, the electric power converter further comprises a control unit to control a switching of the converter switch.\A control unit can be a device providing control signals to the converter switch. Such control signals turn the converter switch on and/or off in a manner that a desired output voltage and/or output current is available across the output terminals of the electric power converter.

Usually, the control signals are determined by the control unit based on some input signals reflecting the state of the converter and applying certain algorithms. For example, the control unit determines the control signals based on the current flowing through the converter switch. This current can for example be determined with a current measurement device as previously mentioned that is arranged within the path from the first converter terminal to the converter switch.

In another preferred embodiment, a snubber circuit for an electric power converter according to the invention comprises a snubber switch and a passive network connected to the snubber switch. The passive network comprises a first capacitor, a second capacitor and a node connecting the first capacitor, the second capacitor and the snubber switch.

Experiments have shown that best suppression of the surge voltage and the voltage ringing were achieved with a snubber circuit according to this embodiment. Further, the snubber circuit of this embodiment has minimal power losses. This increases the efficiency of the electric power converter.

The snubber switch can be a diode.

The first capacitor and the second capacitor can have a capacitance in a range from 1 nF to 10 μF, in particular from 10 nF to 1 μF, and specifically from 100 nF to 500 nF. The first capacitor and the second capacitor can have the same capacitance.

According to a further aspect of the invention, an electric power chain comprises an electric power converter according to the invention. The electric power chain further includes a power source for supplying the electric power converter and a load connected to the electric power converter and supplied with electric power by the electric power converter.

The electric power chain according to the invention can utilize all advantages of the electric power converter according to the invention.

In a preferred embodiment of the electric power chain, the power source includes a battery providing DC power and the load is a DC-load.

Such an electric power chain may be suitable to replace another battery and/or another power source supplying the DC-load.

With advantage, the electric power converter is a DC-DC converter.

An electric battery is a device consisting of one or more electrochemical cells with external connections provided to power electric devices.

Instead of the battery, or in addition to the battery, any power source or power storage can be used, such as for example a generator, a fuel cell, a super cap, or a fly wheel. Specific advantages depend on the specific application of the electric power chain.

A DC-load is an electrical component that consumes DC-power. DC-loads may include but are not limited to lamps, DC-motors, batteries during charging, electronic circuits and DC-fans.

Instead of the DC-load, the electric power chain can comprise any load, such as for example any AC-load. Specific advantages depend on the specific application of the electric power chain.

In another preferred embodiment, a vehicle comprises an electric power chain according to the invention.

A vehicle is a mobile machine that transports people and/or cargo. Typical vehicles include but are not limited to wagons, bicycles, motor vehicles like motorcycles, cars, trucks and busses, railed vehicles like trains and trams, watercraft vehicles like boats and ships, and aircraft and airspace vehicles.

With advantage, the electric power chain according to the invention can be utilized in a vehicle. The electric power chain can replace other power supplies and/or other energy storage devices of said vehicle. Further advantages will become apparent in the following paragraphs.

The electrical drive can be supplied by a traction battery. Usually, a hybrid vehicle has in addition a conventional battery for feeding and/or buffering the board net of the hybrid vehicle. For example, the board net can have voltages of 12 V, 24 V or 36 V. However, most common are board nets having a voltage of 12 V. The board net can comprise loads such as the lighting of the vehicle, the control and/or entertainment electronics of the vehicle, as well as other operational, comfort or safety functions of the vehicle. The conventional battery itself is supplied by a generator driven by the combustion engine. The power chain according to the invention can replace the conventional battery and the generator and, therefore, reduce the weight of the vehicle, which in turn increases the efficiency of the vehicle. The traction battery of the hybrid vehicle may form a part of the power chain according to the invention. For example, the voltage of the traction battery can be 48 V.

Instead of a hybrid vehicle, the vehicle could also be a pure electric vehicle without a combustion engine. Usually, such electric vehicles do not have a generator supplying the board net. Therefore, the weight reducing potential for an electric vehicle is smaller as in a hybrid vehicle, as there is no generator which could be replaced by the power train according to the invention.

According to the invention, a method for reducing a surge voltage across a convert switch of an electric power converter having a first converter terminal, a second converter terminal and a converter switch comprises the step of providing a snubber circuit having a snubber switch and a passive network. The method additionally comprises the step of connecting the snubber circuit to the converter switch, to the first converter terminal and to the second converter terminal.

An advantage of the method according to the invention is that for different layout designs of the electric power converter the surge voltage and voltage ringing across the converter switch can be reduced significantly. Especially, increased distances between the first converter terminal and the converter switch and/or increased distances between the second converter terminal and the converter switch, both increasing the parasitic inductance, can be compensated for with the snubber circuit. Consequently, the blocking voltage requirement of the converter switch can be reduced which in turn allows to employ a more cost effective converter switch. In addition, a converter switch with a lower blocking voltage requirement has lower conducting losses. Therefore, the efficiency of the electric power converter can be increased. Also, filter capacitors which may be connected in parallel to the converter switch may have reduced voltage requirements.

BRIEF DESCRIPTION OF THE DRAWINGS

The drawings used to explain the embodiments show.

In the figures, the same components are given the same reference symbols.

PREFERRED EMBODIMENTS

Figure 1:
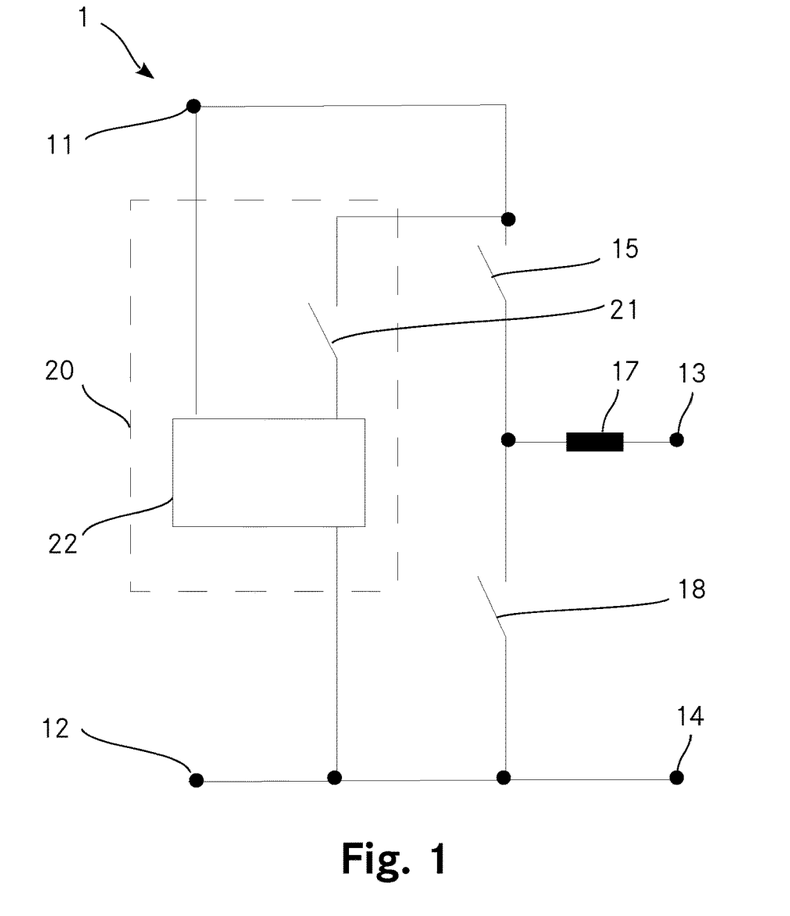
FIG. 1 a first embodiment of an electric power converter according to the invention, FIG. 2 an embodiment of a snubber circuit according to the invention, FIG. 3 a second embodiment of an electric power converter according to the invention, FIG. 4 a third embodiment of an electric power converter according to the invention, FIG. 5 a fourth embodiment of an electric power converter according to the invention, FIG. 6 an embodiment of an electric power chain, and FIG. 7 an embodiment of a vehicle according to the invention.

FIG. 1 shows a first embodiment of an electric power converter 1 according to the invention. The electric power converter 1 comprises a first converter terminal 11 and a second converter terminal 12, both terminals being configured to be input terminals of the electric power converter 1. During operation, a supply voltage is connected to these input terminals. In this first embodiment, the supply voltage is a DC-supply voltage. The positive pole of the DC-supply voltage is connected to the first converter terminal 11 and the negative pole of the DC-supply voltage is connected to the second converter terminal 12.

The first converter terminal is further connected with converter switch 15. This connection, as well as other connections within the electric power converter can be established by a printed circuit board (not shown). Depending on their length and geometry, each connection may comprise a parasitic inductance, parasitic capacitance and/or a parasitic resistance. Especially the parasitic inductance may cause surge voltages across the converter switch 15 when turned off as the current through the parasitic inductance will continue to flow, initially. Together with parasitic capacitances of connections as well as of the components, for example the converter switch 15, a voltage ringing across the converter switch 15 may occur.

When switched on, the converter switch 15 provides an electrically conducting path from the first converter terminal 11 through converter inductor 17 to the third converter terminal 13, and the current through this path will increase. In this first embodiment, the DC-supply voltage across the input terminals, which are the first converter terminal 11 and the second converter terminal 12, is larger than the DC-load voltage across the output terminals, which are the third converter terminal 13 and the fourth converter terminal 14. While third converter terminal 13 provides the positive pole of the DC-load voltage, the fourth converter terminal 14 provides the negative pole of the DC-load voltage. Second converter terminal 12 and fourth converter terminal 14 are connected to each other and are forming a ground potential, or simply referred to as ground.

When turned off, converter switch 15 interrupts the conductive path from the first converter terminal 11 through converter inductor 17 to the third converter terminal 13. The current through converter inductor 17 is forced to commutate from converter switch 15 to further converter switch 18. During converter switch 15 being turned off, the current through converter inductor 17 decreases.

Further converter switch 18 is a diode, for example an ultrafast rectifier with a recovery time of 35 ns, in particular of type MURD320. To reduce conducting losses, the further converter switch 18 can be a transistor, alternatively.

Figure 3:
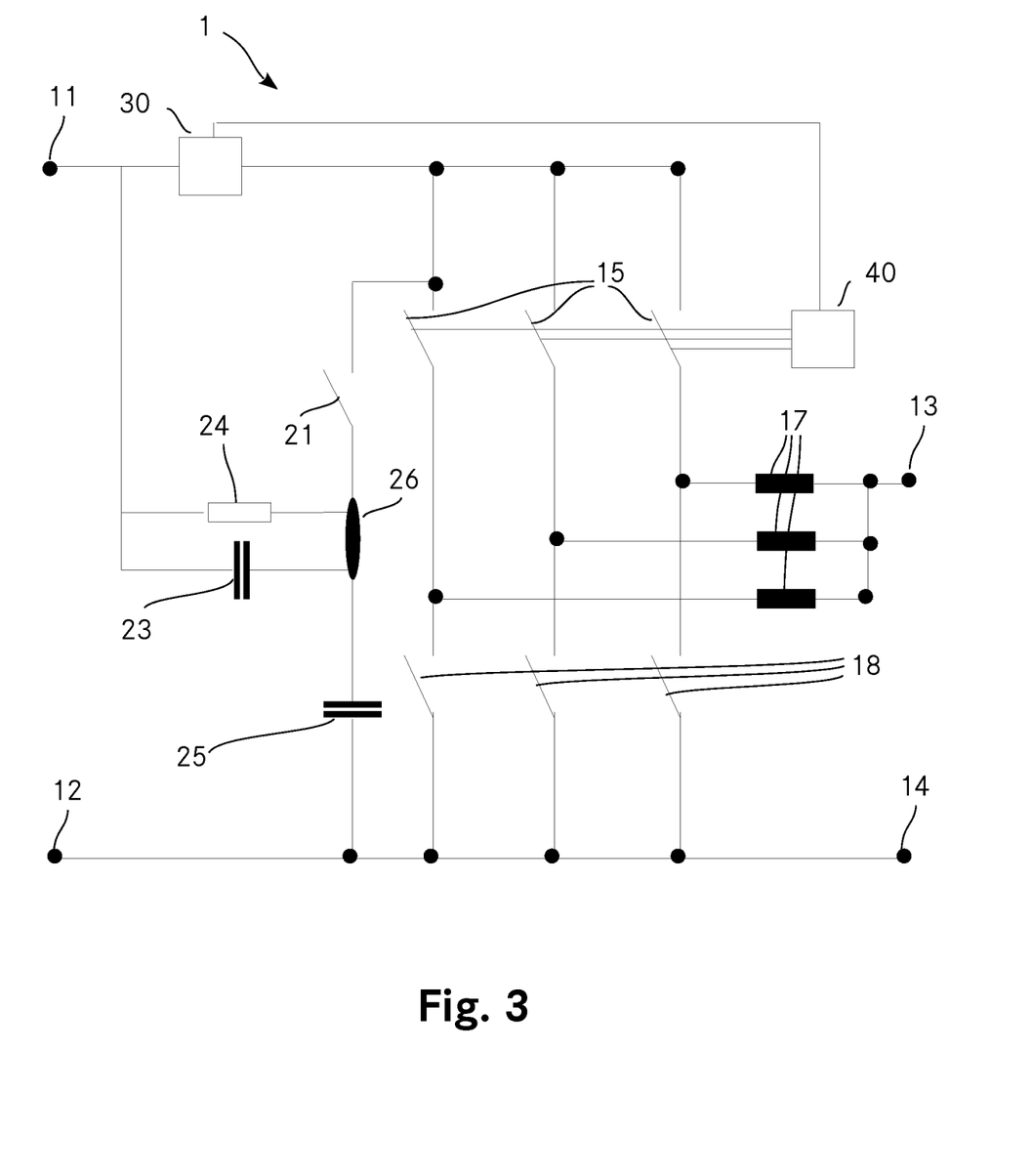

Converter switch 15 is a transistor, for example a power MOSFET of type IRF530. The gate terminal of the power MOSFET can be connected to a control unit 40, as shown in FIG. 3. The source terminal of the power MOSFET is connected to the further converter switch 18 and the converter inductor 17. The drain terminal of the power MOSFET is connected to the first converter terminal 11.

Parasitic inductances between the first converter terminal 11 and the converter inductor 17 can cause a surge voltage and voltage ringing across converter switch 15 upon turn-off. To suppress the surge voltage and voltage ringing across the converter switch 15, a snubber circuit 20 is connected to the converter switch 15, the first converter terminal 11 and the second converter terminal 12. In other words, the snubber circuit is connected with one terminal thereof directly with the converter switch 15 and with another terminal thereof indirectly to the converter switch 15 via first converter terminal 11. The snubber circuit 20 comprises a snubber switch 21 and a passive network 22. The snubber switch 21 is a diode and connected directly to the converter switch 15 and directly to the passive network 22.

Figure 2:
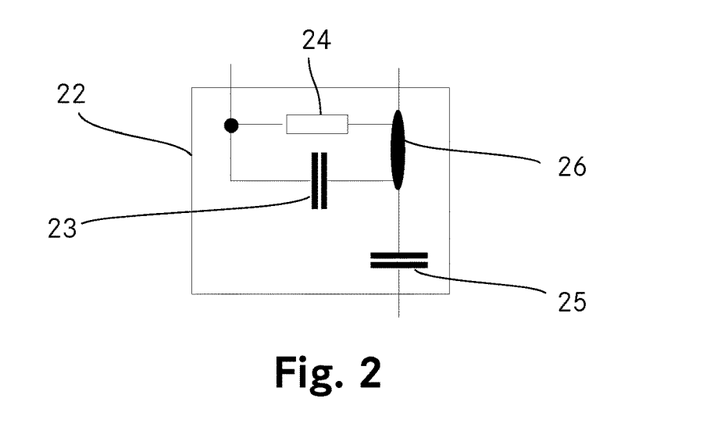

FIG. 2 shows the passive network 22 of snubber circuit 20 in more detail. The passive network 22 comprises a first capacitor 23 and a second capacitor 25. At node 26, the first capacitor 23 and the second capacitor 25 are connected. Node 26 can further be connected with snubber switch 21 (not shown). First capacitor 23 can further be connected to the first converter terminal 11 (not shown). Second capacitor 25 can further be connected to the second converter terminal 12 (not shown). A resistor 24 can be connected in parallel with the first capacitor 23. The first capacitor 23 and the second capacitor 25 can have the same capacitance, for example 220 nF. The resistor can have a resistance of 500 mΩ.

FIG. 3 shows a second embodiment of the electric power converter 1 according to the invention. This embodiment comprises three parallel power stages. Each power stage comprises a converter switch 15, a converter inductor 17 and a further converter switch 18. All power stages have a common input formed by first converter terminal 11 and second converter terminal 12. Also, all power stages have a common output formed by third converter terminal 13 and fourth converter terminal 14. The snubber circuit 20 formed by snubber switch 21, first capacitor 23, second capacitor 25, node 26 and resistor 24 is, in this embodiment, located close to the leftmost converter switch 15 of the converter switches 15 of the three power stages. In this case, the surge voltage and voltage ringing of the leftmost converter switch 15 will be suppressed most effectively. If, for example, in an electric power converter 1 without snubber circuit 20 the rightmost converter switch 15 was exposed to the highest surge voltages and voltage ringing, the snubber circuit 20 should be placed physically close, i.e. within a short distance, to the rightmost converter switch 15 for best results.

In addition, FIG. 3 shows a current measurement device 30 configured to measure the current through converter switches 15. This current is also referred to as the input current of electric power converter 1. The current measurement device 30 can be present in any embodiment and is not only a feature of the embodiment shown in FIG. 3.

FIG. 3 further shows a control unit 40 providing control signals to turn-on and turn-off the converter switches 15. Such control signals can be pulse width modulated (PWM) signals.

In embodiments of the electric power converter 1 with multiple power stages, each power stage of the multiple power stages can be controlled in an interleaved way to reduce the ripple of the input current, which increases the performance of the converter and reduces electromagnetic interference. Control unit 40 is adapted to provide interleaved control signals to the converter switches 15.

Figure 4:
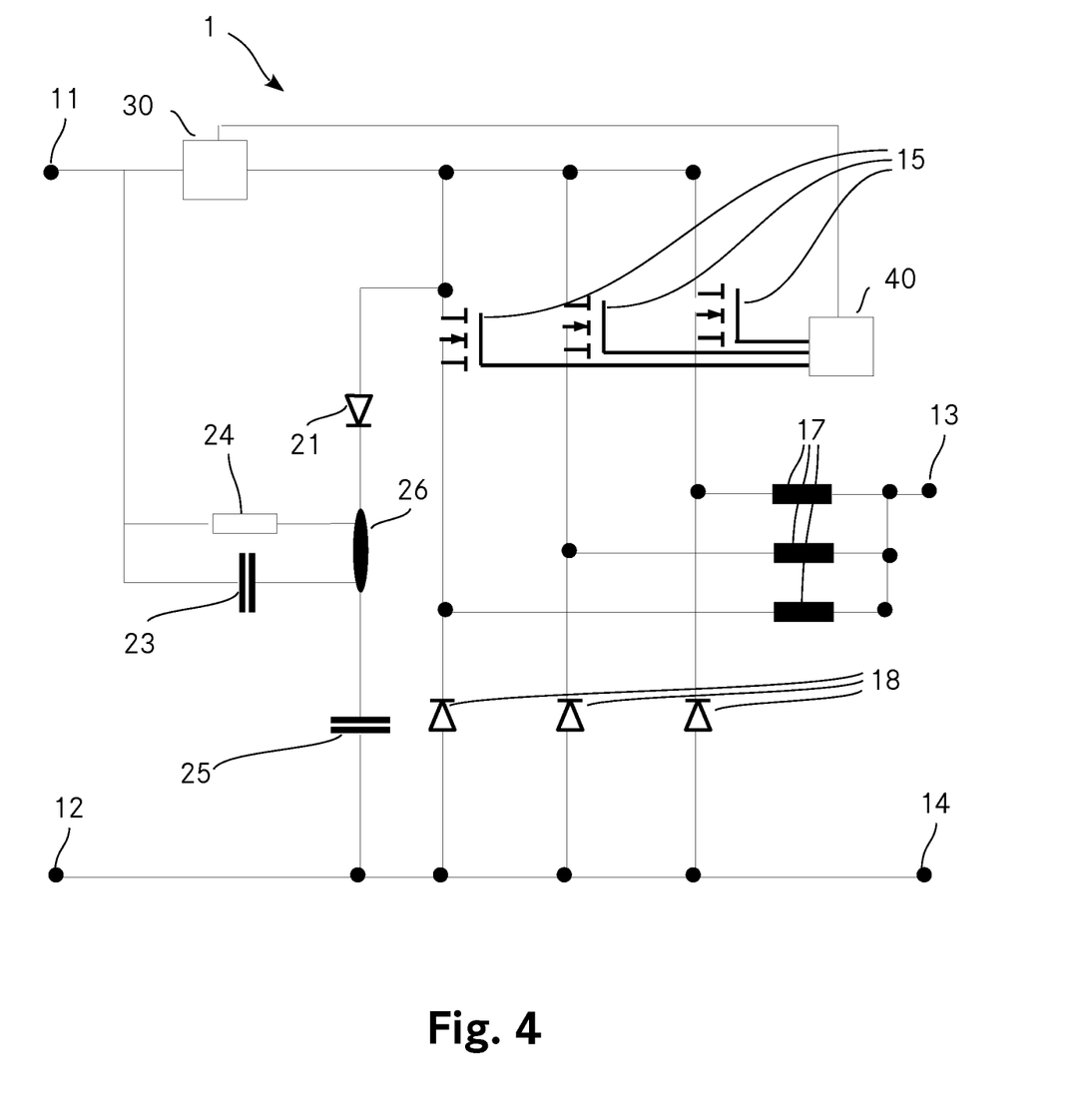

FIG. 4 shows an embodiment wherein switches 18 and 21 are implemented in form of diodes and converter switches 15 are implemented in form of metal oxide semiconductor field effect transistors (MOSFET).

Figure 5:
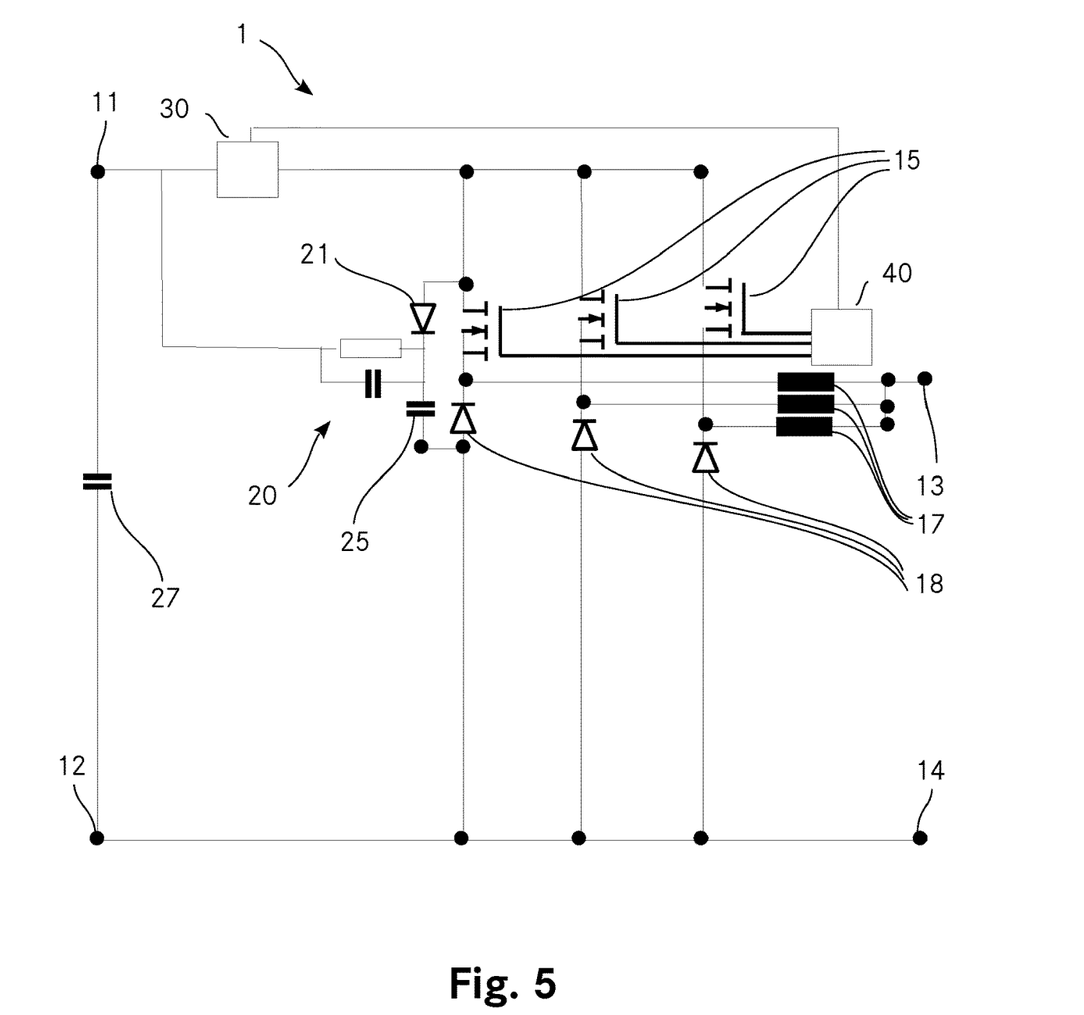

Although showing a circuit diagram and not a layout of the electric power converter, FIG. 5 is intended to indicate that the snubber circuit 20 is located as closely as possible to the converter switch 15 which is exposed to unacceptable surge voltages and voltage ringing if no snubber 20 was used. A minimum distance of the snubber circuit 20 to the converter switch 15 ensures a minimum parasitic inductance. In particular, the diode 21 and the second capacitor 25 are in minimum distance to the converter switch 15 and the diode 18 located. The electric power converter shown in FIG. 5 is realized with a printed circuit board (not shown). The printed circuit board comprises a ground plane. The ground plane allows for short connections between the different components of the electric power converter to achieve low parasitic inductances. Especially those parasitic inductances which are essential for the reduction of surge voltages and/or voltage ringing across the converter switch can be kept minimal.

FIG. 5 further shows a filter capacitor 27 connected to the first converter terminal 11 and the second converter terminal 12. Electrically, filter capacitor 27 is connected in parallel to the series connection of snubber diode 21 and second capacitor 25, because the influence of the current measurement device 30 can be neglected. Further filter capacitors (not shown) can be placed in short distance to any of the converter switches 15 and in parallel to the series connection of snubber switch 21 and second capacitor 25, if present, of in parallel to the series connection of converter switch 15 and further converter switch 18.

The use of diodes for switches 15 and 18, and the use of MOSFETs for converter switches 15, and the use of one or more filter capacitors is independent of each other. Therefore, each combination thereof is possible.

Figure 6:
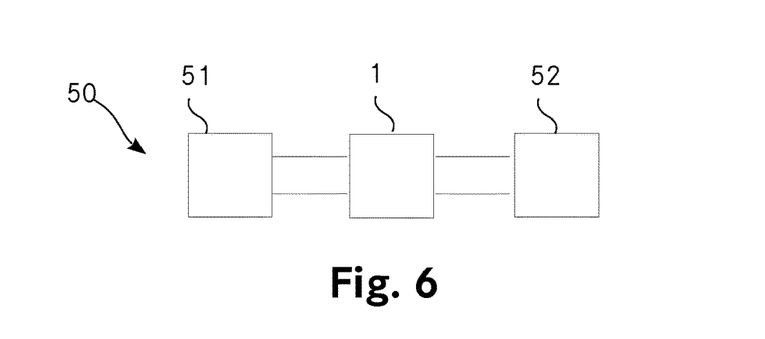

FIG. 6 shows an embodiment of an electric power chain 50. Electric power chain 50 comprises a battery 51 supplying an electric power converter 1 according to the invention. Electric power chain 50 further comprises a DC-load 52 supplied by the electric power converter 1.

Figure 7:
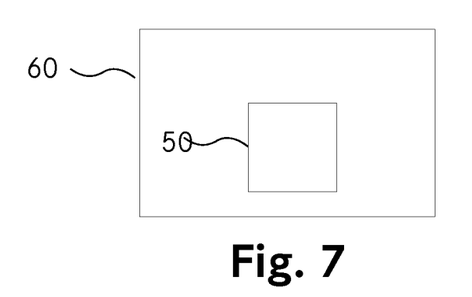

FIG. 7 shows an embodiment of a vehicle 60 according to the invention. The vehicle 60 comprises an electric power chain 50 according to the invention.

In various embodiments, the converter switch 15 and/or the further convert switch 18 can be composed of a plurality of switches arranged in parallel. For example, converter switch 15 may be composed of a plurality of transistors being connected in parallel to each other. These transistors connected in parallel to each other and forming converter switch 15 can be of the same type of transistor. The same applies for further converter switch 18. A plurality of diodes connected in parallel to each other can form further converter switch 18. These diodes connected in parallel to each other can be of the same type of diode. Such converter switches 15 and further converter switches 18 can be utilized in any embodiment of the electric power converter 1 according to the invention, regardless if the electric power converter 1 comprises multiple power stages or not. Thereby, a wide range of different power ratings for the electric power converter 1 is achievable although using always the same type of switch.

Although discussed in detail for DC-DC converters only, the electric power converter 1 comprising a snubber circuit 20 according to the invention is not limited to DC-DC converters. The electric power converter 1 may be any AC-AC, AC-DC and/or DC-AC converter.

The values of the passive components, such as capacitors and resistors for example, depend on the parasitic inductances and capacitance within the electric power converter 1 and thereby of the actual layout and design of the electric power converter, especially of a printed circuit board if used.

In summary, it is to be noted that the electric power converter 1 comprising a snubber circuit 20 according to the invention is capable to significantly reduce the surge voltage and voltage ringing across the converter switch 15. Due to the small conducting losses and small switching losses of the converter switch 15, the efficiency of the electric power converter 1 is excellent. In addition, the snubber circuit 20 is capable to feed some of the energy of the surge voltage back to the input of electric power converter 1 for reuse.

The invention claimed is:

1. An electric power converter having a first converter terminal, a second converter terminal, a converter switch and a snubber circuit, the snubber circuit comprising
   a) a snubber switch,
   b) a passive network connected to the snubber switch, and
   c) a control circuit that controls the converter switch,
wherein the snubber circuit is directly connected to the converter switch, the first converter terminal and the second converter terminal, wherein a current measurement device connected directly or indirectly to the snubber circuit has an output that is a measure of the input current of the electric power converter, and wherein the output of the current measurement device is connected to the control circuit.

2. The electric power converter according to claim 1, wherein the electric power converter is a DC-DC converter.

3. The electric power converter according to claim 2, wherein the first converter terminal is a positive input voltage terminal and the second converter terminal is a negative input voltage terminal or ground terminal.

4. The electric power converter according to claim 2, wherein the electric power converter is a buck converter or a multi stage buck converter.

5. The electric power converter according to claim 1, wherein the converter switch is connected to the first converter terminal.

6. The electric power converter according to claim 1, wherein the converter switch is a semiconductor switch.

7. The electric power converter according to claim 6, wherein the converter switch is a transistor or a field effect transistor.

8. The electric power converter according to claim 1, wherein the snubber switch is a semiconductor switch.

9. The electric power converter according to claim 8, wherein the snubber switch is a diode with an anode thereof connected to the converter switch.

10. The electric power converter according to claim 1, wherein the passive network comprises
    a) a first capacitor,
    b) a second capacitor, and
    c) a node connecting the first capacitor, the second capacitor and the snubber switch,
    and wherein
    d) the first capacitor is connected to the first converter terminal, and
    e) the second capacitor is connected to the second converter terminal.

11. The electric power converter according to claim 10, wherein the passive network further comprises a resistor connected in parallel with the first capacitor.

12. The electric power converter according to claim 1, wherein the snubber circuit is arranged such that 1) an inductance of a connection of the snubber circuit to the first converter terminal is larger than an inductance of a connection of the snubber circuit to the second converter terminal or 2) the inductance of the connection of the snubber circuit to the first converter terminal is larger than an inductance of a connection of the snubber circuit to the converter switch or 3) the inductance of the connection of the snubber circuit to the first converter terminal is larger than the inductance of the connection of the snubber circuit to the second converter terminal and the inductance of the connection of the snubber circuit to the first converter terminal is larger than the inductance of the connection of the snubber circuit to the converter switch.

13. The snubber circuit for the electric power converter according to claim 1, comprising
    a. the snubber switch and
    b. the passive network connected to the snubber switch, wherein the passive network comprises
    c. a first capacitor and
    d. a second capacitor, and
    e. a node connecting the first capacitor, the second capacitor and the snubber switch.

14. The electric power converter according to claim 13, wherein the snubber circuit is arranged such that 1) a parasitic inductance of a connection of the snubber circuit to the first converter terminal is larger than an inductance of a connection of the snubber circuit to the second converter terminal or 2) the parasitic inductance of the connection of the snubber circuit to the first converter terminal is larger than a connection of the snubber circuit to the converter switch or 3) the parasitic inductance of the connection of the snubber circuit to the first converter terminal is larger than the inductance of the connection of the snubber circuit to the second converter terminal and the parasitic inductance of the connection of the snubber circuit to the first converter terminal is larger than the connection of the snubber circuit to the converter switch, and further wherein a snubber switch and the second capacitor are located at distance to the converter switch and a further switch and/or the second converter terminal.

15. An electric power chain comprising the electric power converter according to claim 1, further including a power source for supplying the electric power converter and a load connected to the electric power converter and supplied with electric power by the electric power converter.

16. The electric power chain according to claim 15,
a) wherein the power source includes a battery and
b) wherein the load is a DC-load.

17. A vehicle comprising the electric power chain according to claim 15.

18. The vehicle according to claim 17, wherein the vehicle is a hybrid vehicle.

19. The vehicle according to claim 18, wherein the vehicle is a hybrid car having a combustion engine and an electrical drive.

* * * * *